United States Patent [19]

Winzen

[11] Patent Number: 5,024,211
[45] Date of Patent: Jun. 18, 1991

[54] HEAT EXCHANGE MEDIUM CONNECTOR FOR MOVABLE SOLAR HEATERS

[75] Inventor: Wilfried Winzen, Pforzheim, Fed. Rep. of Germany

[73] Assignee: Witzenmann GmbH Metallschlauch-Fabrik Pforzheim, Pforzheim, Fed. Rep. of Germany

[21] Appl. No.: 460,272

[22] Filed: Jan. 2, 1990

[30] Foreign Application Priority Data

Jan. 5, 1989 [DE] Fed. Rep. of Germany ....... 3900203

[51] Int. Cl.$^5$ .............................................. F24J 2/00
[52] U.S. Cl. ................................................. 126/424
[58] Field of Search ..................... 126/424, 425, 438

[56] References Cited

U.S. PATENT DOCUMENTS

| | | | |
|---|---|---|---|
| 2,920,710 | 1/1960 | Howard | 126/424 |
| 4,078,549 | 3/1978 | McKeen et al. | 126/425 |
| 4,791,963 | 12/1988 | Gronert et al. | |
| 4,856,494 | 8/1989 | Schussler et al. | 126/424 |
| 4,875,716 | 10/1989 | Winzen et al. | |

OTHER PUBLICATIONS

ASME Publication 84PVP 120, "Large Deflection Analysis and Application of Flexible Hoses in Solar Collectors", by M. S. M. Roa, 8 pages, data unknown.

Primary Examiner—Carroll B. Dority
Attorney, Agent, or Firm—Frishauf, Holtz, Goodman & Woodward

[57] ABSTRACT

To connect a heat exchange arrangement (2) which moves with a movable mirror (1) in a solar heating system, in which the mirror follows the movement of the sun relative to the earth during the day, and is pivotable to a "night" position (a, FIG. 1) protected against contamination and precipitation, a flexible hose (4) is coupled to the heat exchange arrangement at one end and, at the other, is connected to a coupler element (5) which is movable radially with respect to the pivot axis about which the mirror moves. Preferably, the coupling element is attached to an elongated pivot arm (6) which forms an essentially rigid connecting pipe for the heat exchange fluid, the pivot arm (6) being movable through a limited angle (13) and carrying the coupling element (6) at its end, the coupling element moving along a radius passing through the pivot axis of the mirror, when the mirror is at least approximately in the "noon" position, or halfway through its pivoting arc. This pivoting arc of the mirror (1) will be between about 200°–270°, in view of the "night" position. The flexible hose, preferably, is a corrugated metal hose, and stop means (10; 45, 46) are provided for flexible joints and the deflection of the elongated rigid pipe (6).

15 Claims, 5 Drawing Sheets

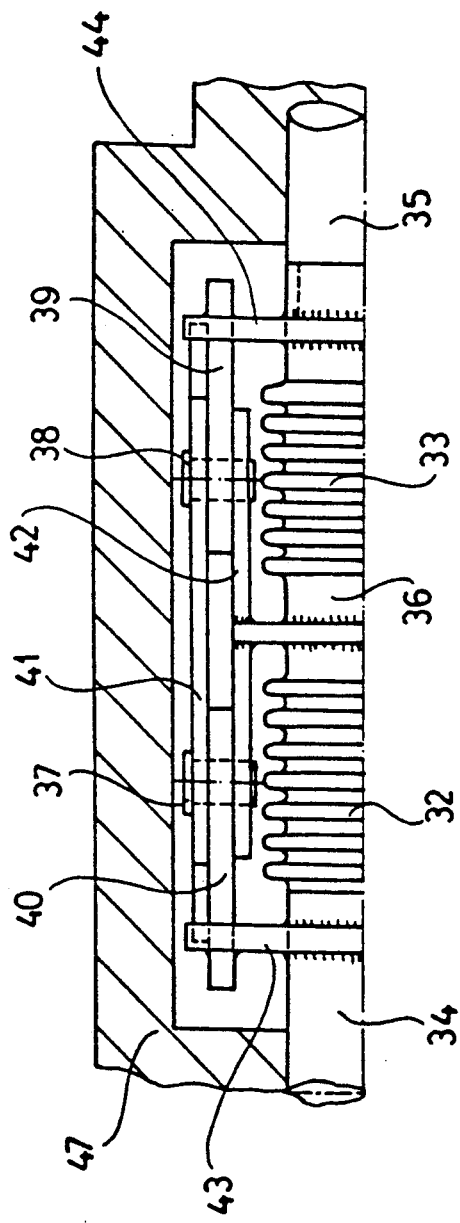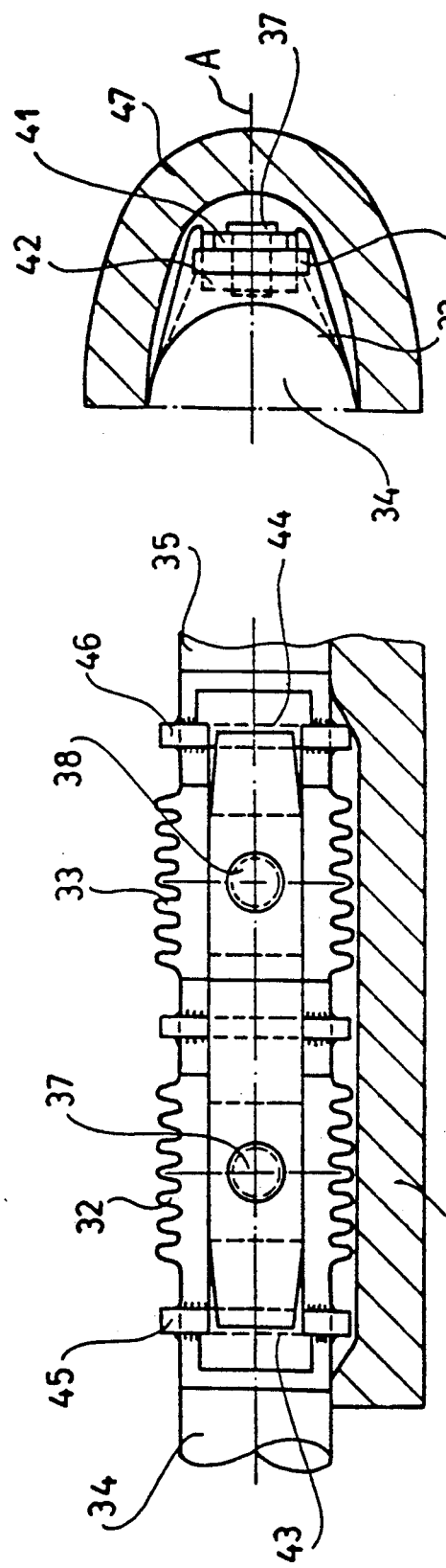

HEAT EXCHANGE MEDIUM CONNECTOR FOR MOVABLE SOLAR HEATERS

Reference to related patents, assigned to the assignee of present application, the disclosure of which is hereby incorporated by reference:

U.S. Pat. No. 4,791,963, GRONERT et al
U.S. Pat. No. 4,856,494, SCHUSSLER et al.

Reference to related literature:
"High Tech", March '88, pp. 111-114, "Solar Cash".
ASME Publication 84PVP 120 "Large Deflection Analysis and Application of Flexible Hoses in Solar Collectors", by M. S. M. Roa.

FIELD OF THE INVENTION

The present invention relates to a solar heating system, and more particularly to a connection arrangement for a heat exchange carrier which is exposed to solar radiation concentrated thereon by a mirror system, in which the mirror system moves with the changing position of the sun with respect to the earth. Typically, the mirror system is rotatable about an axis which may, for example, be essentially horizontal or perpendicular to the arc through which the sun passes at any given season.

BACKGROUND

The referenced U.S. Pat. No. 4,856,494, SCHUSSLER et al, the disclosure of which is hereby incorporated by reference, describes a solar heating system and the various positions which the mirror system has to assume as the earth and the sun move relative to each other. Various types of solar systems are coupled to automatic positioning apparatus which move the mirror system in accordance with the position of the sun. The mirror system must move, to follow the sun, about an angle of approximately 180°. At night, the mirror system is additionally deflected so that the mirror will face downwardly, so that its reflective surface will not be impaired by deposits, dust, dirt, or precipitation of any kind, for example rain or snow. Thus, the mirror must move not only about the 180° determined by relative movement of the sun but, additionally, tip downwardly beyond a predetermined dead point so that, within any 24 hour period, the mirror may have to move about an angular range of between 200° and 270°. This angle is covered by the movement of the mirror, or the mirror system, twice during any 24 hour period, once to move the mirror from the "night" position to follow the sun, and then, after the sun has set, back towards the "night" position.

The connection to a heat exchange arrangement must, likewise, move with the mirror, and hence move twice every 24 hours over the mirror angular range. Heat exchange systems typically include a heat exchange fluid, which heats as solar radiation is concentrated thereon. Relative movement, thus, will result between the heat exchange arrangement on the solar heater itself and a fixed heat exchange fluid connection or coupling point. To compensate for the movement, it has been proposed to connect the fixed coupling or connection point and the heat exchange arrangement with a flexible hose, typically a corrugated flexible hose. Such flexible hoses are subject of extreme requirements. They are under high pressure, for example a pressure of over about 40 bar, retaining fluids, typically liquids, which will reach a temperature of between 300° to 400° C.

Difficulties with such connections and such hoses have been experienced and the referenced U.S. Pat. No. 4,875,716, WINZEN et al, describes a solution. The flexible hose, as the mirror system moves, changes its direction of bending. The direction of bending changes rapidly, in what might be termed a "snap-over" manner. The position at which the bend snaps over from one direction to the other is indeterminate and changes with the direction of movement of the mirror, for example it snaps at different positions when the mirror follows the sun and when the mirror returns after sunset to the initial and then the "night" position. This snap-over substantially stresses the flexible hose and resulted in failures of solar heating systems. The referenced patent describes arrangements to decrease the stresses on the hose and to increase the resistance to failure.

The system described in the referenced U.S. Pat. No. 4,875,716 provided a substantial improvement over prior art systems. Yet, the hose proved to be difficult to make and was expensive.

cl The Invention

It is an object to further improve a solar heating system of the general type described in the referenced U.S. Pat. No. 4,856,494, in which the loading on the hose, and particularly the bending stresses are reduced, so that the system is further improved and the lifetime of the replaceable bending hose is still increased.

Briefly, a hose which is shorter than that previously used is coupled to a fixed connecting point for heat exchange fluid through a movable coupler which can move radially with respect to the axis of rotation of the mirror system, for example along a radial line connecting the mirror pivot axis with the fixed heat exchange arrangement on the mirror system, and which rotates with the mirror system. The coupler is located, preferably, at the circumference of a theoretical circle which has a center at the mirror pivot axis and at a radius corresponding to the distance between the mirror axis and the heat exchange arrangement. The coupler can be connected to the fixed heat exchange fluid connector by a rigid pipe which, in turn, is coupled to the heat exchange connector by a movable joint, the movable pipe pivoting about the flexible connector and permitting movement of the coupler between the pipe and the flexible hose along essentially the radial line passing through the mirror pivot axis.

The invention is based on the discovery that the solution to the problem of connecting the heat exchange arrangement, which moves with the mirror to a fixed supply-and-drain connection, cannot be obtained by improvements in the flexible hose as such but, rather, requires an entire rethinking of the operation of the solar heating system. The pressure and temperature loading placed on the flexible hose cannot be changed; the pressure and temperature parameters are given by the design of the solar heating system. A decrease in stresses placed on the flexible hose can be obtained only by revision of the kinematic relationships affecting the hose as it changes its position upon movement of the mirror system. Analysis, based on this discovery, has shown that in the end region the pivot radii of the hose are small, and thus place heavy bending stresses on the hose, which is particularly detrimental to the hose since the stresses change in direction as the mirror first, for example, moves towards the "night" position and then reverses direction as the sun rises. The analysis has further shown that at the "noon" position of the mirror system, the flexible hose is in essentially stretched position. This stretched position defines a certain length between the heat exchange arrangement and the fixed fluid connections. This length of the stretched hose must be fitted to a smaller distance when the mirror is in the terminal positions, e.g. "night" and "sunset". A substantial length of hose was thought necessary to prevent tight bending radii.

In accordance with the present invention, however, the hose has been shortened substantially and, rather, the coupling of the hose to the fixed heat exchange fluid connection is made movable, so that the coupling can move as the mirror system rotates. This permits much better placement of the hose in the region of the mirror system and much more favorable bending radii for the hose. As the mirror system moves from a noon position, in which the hose is stretched, towards the terminal positions, the coupling also moves away from the center of the pivot axis so that in the end regions of the pivot angle of the mirror system, the hose is bent only along a simple, essentially part-circular curve which can be readily accomodated by hose of standard construction.

In accordance with a particularly advantageous feature of the present invention, the hose can be made substantially shorter than heretofore, for example less than half the length previously thought necessary, since snap-over regions of the hose are no longer needed. This renders the connecting hose not only substantially less expensive, but also permits a more compact construction of the entire heat exchange fluid system.

In accordance with a preferred feature of the invention the coupling of the hose is connected to an elongated rigid pipe which is connected by a flexible coupling to the fixed connection for the heat exchange fluid, the essentially rigid pipe permitting movement of the coupling to the hose along a shallow arc having at its terminal points the positions of the coupling for the hose when the mirror is in the "noon" position and when it is in "night" position.

The length of this pivot arm formed by the rigid pipe, and the flexing angle of the pivot arm, or the pivot angle, defines the positioning path of the coupling element, extending essentially radially to the pivot axis of the mirror system. The flexible hose can be connected to the end of the pivot pipe via a flexible coupling in order to prevent formation of a sharp bend of the hose adjacent the coupling. Likewise, the hose is preferably connected to the heat exchange arrangement, exposed to the solar radiation, by a flexible coupling.

If the overall system is of substantial size, so that the flexible hose itself will be of substantial length, one or both of the flexible connections between the coupling and the hose may be omitted, since the flexing capability of the hose itself may be sufficient.

The connection of the pivoting pipe with the fixed heat exchange fluid connection can be done by a flexible connector or an angle compensating system of well known construction. Preferably, and particularly in view of the requirement of absolute tightness, a closed, sealed construction, in which substantial pressures can be retained, arrangements which are similar to a corrugated or bellows type construction are preferred.

In dependence on loading, degree of the pivot angle and overall layouts, one or more angle compensator or bellows connector can be combined. To prevent possible failures, the deflection of any one of the connectors can be limited, for example by limit stops, so that the bending angles of the respective angular connectors are restricted, each, to safe and acceptable levels.

In accordance with a preferred feature of the invention the movement of the pivoting pipe likewise is limited by a stop. This permits control of the position of the flexible hose to set the bending angle through which the flexible hose must bend to a desired curve portion. In an ideal situation, the curve is essentially part-circular.

The pivot pipe can move as required by mirror rotation. It will return to its final position usually by gravity. If frictional losses or other couplings apply forces insufficient to permit return of the pivot pipe to a predetermined end position, additional loading by weights or springs may be provided.

The flexible hose, itself, can be of any suitable construction, well known in such systems. In accordance with a preferred feature of the invention, however, the flexible hose preferably has an oval or elliptical cross section, in which the larger cross-sectional axis extends transversely to the bending axis of the flexible hose. Alternatively, a plurality of hose elements of circular cross section can be located next to each other, for example surrounded by a common sleeve which may include insulation material, the respective individual hose elements being located next to each other transversely to the bending axis of the overall hose system.

Unitary systems can be used, as well as hose systems having three or more parallel hose elements or hose units which, for example adjacent the connection to the heat exchange arrangement, are joined or commonly coupled thereto; a similar joining or common connection is provided adjacent the radially movable coupling. Such multiple unit-single unit connectors are well known in the fluid handling industry, and any suitable arrangement may be used.

DRAWINGS

FIG. 5 is a longitudinal fragmentary sectional view illustrating a flexible joint;

FIG. 6 is a fragmentary view of FIG. 5, rotated over 90°;

FIG. 7 is a fragmentary cross-sectional view illustrating the coupling arrangement;

DETAILED DESCRIPTION

Figure 1:
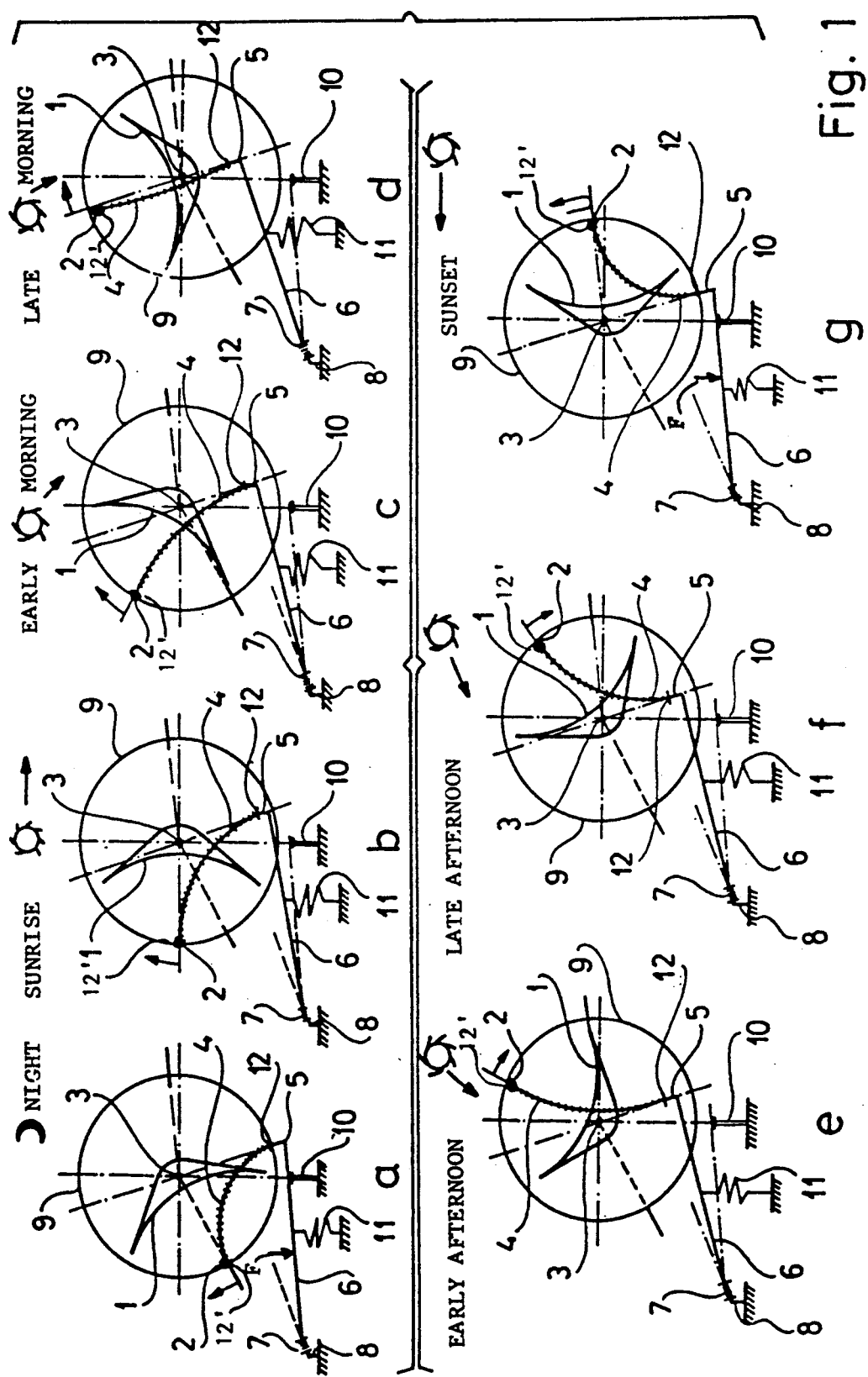
FIG. 1 is a highly simplified diagram of a solar heating system illustrating a movable mirror in various positions in diagrams a to g as the sun and the earth move relative with each other.

FIG. 1 is a simplified diagram of a solar system in seven different operating positions. A mirror system 1 focuses sunlight on a heat exchanger system or arrangement 2. The mirror system 1 is rotatable about an axis of rotation 3 which, for example, is located in a horizontal plane, the heat exchanger arrangement 2 traveling with the mirror system.

The heat exchanger arrangement 2, for example including a plurality of fluid ducts, is coupled via a flexible hose 4 with a coupling element 5. The coupling element 5, in turn, is seated with a right angle elbow on a rigid pipe 6. The rigid pipe 6 is coupled through a tight flexible coupling 7 with a fixed connection 8. The connection 8 is a fluid, typically liquid connection with provides for flow of a heat exchange liquid through the heat exchange arrangement 2. A similar coupling arrangement is located at an axially remote part of the mirror, not shown, and in a plane parallel to the plane of the drawing. Heat exchange liquid, for example, can be circulated from the connection 8 through flexible connection 7, pipe 6, coupling 5, flexible hose 4, through the heat exchange arrangement 2, and out at an axially remote end through a system which is identical to that to be described.

Mirror 7 and heat exchanger 2 are movable between various positions illustrated in respective graphs of FIG. 1. In accordance with graph a, the system is in the "night" position in which the mirror 1 is facing downwardly, so that its mirror surface is downwardly inclined and not exposed to contamination by precipitation, dirt, dust or the like.

Upon sunrise, the mirror system is rotated about the axis 3 to meet the rising sun, see position b of FIG. 1; as the sun and the earth move with respect to each other, the mirror 1 and the heat exchanger 2, coupled thereto, move through an early morning position (see position c), to a late morning position just before noon, as seen at position d. At noon, with the sun overhead, the mirror could be in an essentially horizontal position, pointing straight up if, for example, installed at the equator, or in cross section pointing up; the rotation axis 3, however, may be somewhat inclined from the horizontal. In the early afternoon, just after noon, the position of the system will be as seen at e of FIG. 1, to then rotate through late afternoon, seen at position f, to the position at sunset, see position g, which can be the reverse of the position b. After sunset, the mirror system 1 together with the heat exchange arrangement 2 will swing back to the night position a, so that the cycle can repeat the next day. Of course, as the mirror 1 and the heat exchanger arrangement 2 move through the respective positions, the flexible hose 4 must move with it, bending from the left-hand bend position at a through an almost straight position at d and e to a right-hand bend in the afternoon and to sunset; and then bending back again to the night position at a.

In accordance with the present invention, and to permit bending of the flexible hose 4 to follow, as closely as possible, a circular path between the heat exchanger 2 and the end of the connecting line, formed by the coupling 5, the coupling 5 is so arranged that it can shift its radial position with respect to the pivot axis 3 of the mirror system, and with it, of course, the heat exchange arrangement. This requires that the coupling end, while considering the respective bend and bending direction of the hose 4, as well as the length of the hose 4, can follow the movement thereof, and, further, the movement which the heat exchange arrangement 2 carries out. The hose 4, of course, being coupled to the heat exchanger 2, must then move with its heat exchange end along a circular path 9, which is concentric with the axis of rotation 3 of the mirror system 1.

The coupling 5, thus, must be so placed that for any position of the hose 4, at any pivoted position of the heat exchanger 2, the coupling 5 will have connection conditions which permit movement of the heat exchanger 2 in the circular path 9 while, considering the length of the flexible hose, the coupling 5 follows the movement as the hose 4, coupled to the heat exchanger 2, passes around the circle 9. Thuse, the coupling element 5 is movable radially along radial lines extending opposite the heat exchanger 2 from the pivot axis 3.

Permitting radial shift of the coupling 5, obtained by the flexible joint 7, to the connecting pipe 6, enables the hose 2 to bend or flex to a substantially lesser degree than heretofore The deflection of the pipe 6, forming a lever arm, is limited downwardly by a stop 10. Stop 10 is so adjusted that the hose 4 will assume a bent shape which is approximately part-circular when it is in position a, b and g, respectively. Usually, the pipe 6 may be heavy enough so that it reaches the stop 10 itself, by gravity; if this is not sufficient, a downwardly directed force F can be applied thereagainst, for example by a weight, or by spring 11, as illustrated. This spring continuously loads the arm 6 in downward direction, thus providing a stretching force as the hose passes between position b through position d, e to position f, and ensures approximately circular deflection or bending of the hose 4. The connecting pipe 6 forming the lever arm, and the geometrically fixed connection 8, should be a tight flexible joint; it can be formed by any well known flexible joint or by a short piece of corrugated hose, similar to hose 4. It is, of course, equally possible to form the joint 7 by a plurality of joint elements, each of which has limited angular deflection, so that the angular loading on any one of the elements is restricted to safe levels which maintain tightness.

The connection between the coupling 5 and the hose 4, shown schematically at 12, can also be a flexible or joint type connection, in form of an angle compensator, or a flexible coupling, in order to prevent localized kink or bending loading being applied to the hose 4; a similar flexible joint connection 12' can be placed between the hose 4 and the heat exchange arrangement 2, if necessary.

The length of the hose, and the position of the hose 4 with respect to the coupling element 5, should preferably be so arranged that, when the heat exchange arrangement 2 is in the high noon position, the coupling 5 is diametrically opposite the heat exchanger 2, that is, on a line passing through the mirror pivot axis 3. This position need not be precisely at noon, but can be obtained already at late morning. In this position, the hose 4 will be essentially straight, shown at position d. This position corresponds, essentially, to the center of the overall pivoting angle through which the heat exchanger 2 passes between the "night" position at a, of FIG. 1, and the sunset position at g of FIG. 1. Since the night position is tipped downwardly from the sunrise position, compare position a and b, the center position will be before the mirror faces the sun at noon.

Figure 2:
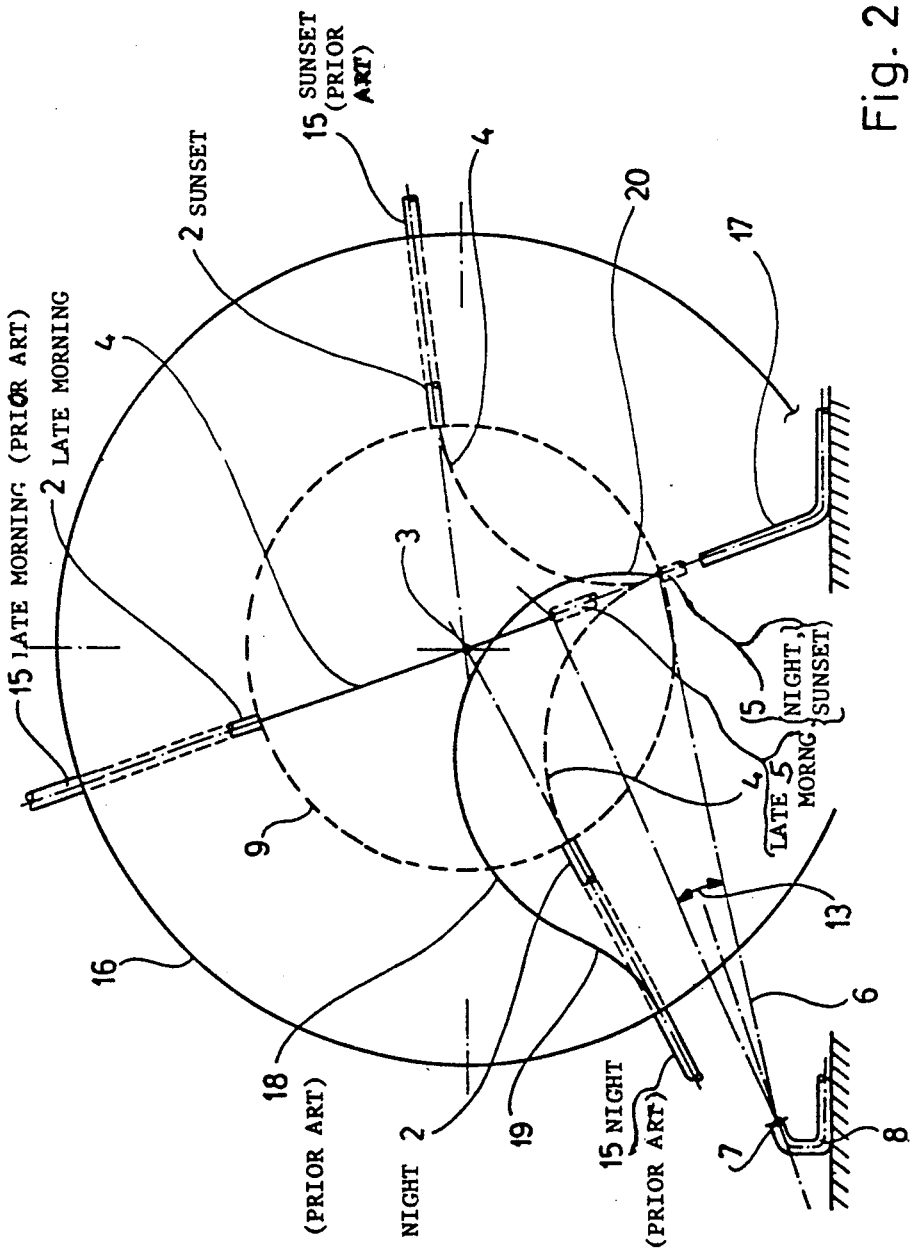
FIG. 2 is an enlarged view of the position of the flexible heat exchange fluid hose in various positions of the mirror and contrasting the hose of the present invention with a prior art hose.

FIG. 2 illustrates the change in position of the hose 4, and of the coupling 5 to an enlarged scale, and also provides a comparison of the arrangement in accordance with the present invention with respect to the arrangement of the earlier referenced U.S. Pat. No. 4,856,494.

The heat exchanger element 2, from the night position and throughout the day, moves along the circle 9.

The heat exchanger position of the heat exchanger 2, at the left side, shows the night position; at the right side, the sunset position, whereas intermediate these two positions, it is in the late morning, before noon position. The hose 4 is shown in broken lines for the night and sunset position; it is shown in solid lines for the late morning or straight or stretched position. Likewise, the position of the coupling element 5 is illustrated in broken lines for the night and sunset position, and in solid lines for the late morning position. As seen in FIG. 2, the hose 4 passes through the pivot axis 3 in the late morning position, and the coupling 5 is inwardly of the circle 9.

FIG. 2 also clearly shows that the coupling 5 has two different radial positions with respect to the axis 3, in dependence on the time-of-day. This illustrates the radial adjustment of the coupling element 5 with respect to the pivot axis 3. The lever arm formed by the pipe 6 is only shown schematically in chain-dotted lines. Actually, the coupling 5 will pass through a small arc which, however, due to the length of lever arm 6 with respect to the distance of movement is, effectively, a diametrical line and the curvature can be ignored. The double arrow 13 shows the pivot angle through which the pipe 6 can move. The flexible joint 7 permitting the angular deflection shown by angle 13 between pipe 6 and the fixed connection 8 is shown only schematically. The pipe 6 permits shift of the radial position of the coupling element 5 in dependence on the time of day, and corresponding to the respectively different positions of the heat exchange arrangement 2 on its circle of rotation 9.

FIG. 2 also illustrates the difference between the present invention and the prior art, as exemplified by the referenced U.S. Pat. No. 4,875,716. In accordance with the referenced patent, the heat exchanger 15 thereof moves about a circular path 16 throughout the day, the radius of which is about twice that of the circle 9. The flexible hose 18, secured in a fixed radial position given by the connecting line 17 is about twice as long as that of the hose 4 in accordance with the present invention. This is due, basically, to the difference in operation since the hose 18 has two bend points 19, 20 bending the hose in respectively different directions. To permit this double bend, it is necessary to accomodate the difference in distance between the end of the fixed connecting point 17 and the heat exchanger 15 when in the night position, the late morning position and the sunset position, without excessively bending the connecting ends of the hose 18.

FIG. 2 graphically shows the substantial decrease of bending stresses placed on the hose with respect to the prior art structure, since the hose 4 is bent only along a part-circular arc, then stretched, and bent in circular form in the opposite direction, terminating essentially tangentially with respect to the circular bending arc. FIG. 2 also graphically shows the decrease in stresses placed on the hose in the light of the overall construction, and the substantial reduction in size which can be obtained, by comparing the diameters of the circles 9 and 16. This difference in size, of course, will be reflected in the overall dimensioning of the entire solar system, and its connection arrangement. The length of the hose, if coupled in accordance with the present invention with a movable connector 5, will no longer have any influence on the size of the solar system design.

The focal point of the mirror system 1 of course will influence the position of the heat exchanger 2. The location of this focal point, however, can be selected in accordance with overall design criteria, without considering the positioning and length of the flexible hose 4. Thus, some radial differences between the heat exchanger arrangement 2 and the circle 9 could be bridged by a length of rigid pipe, extending in radial direction and coupling the heat exchanger arrangement 2 with the end of the flexible hose 4.

The flexible hose itself can be constructed as well know in flexible pressure hose systems. In accordance with a preferred form of the invention, the hose preferably is surrounded by a reinforcing braiding and heat insulation, provided the hose is designed to accept high pressures and temperatures. Hoses of this type accepting pressures up to about 160 bar, and for even higher pressures, and having operating temperatures in the 400° range, are readily available thus, special designs for hoses for solar installations are not required.

Figure 3:
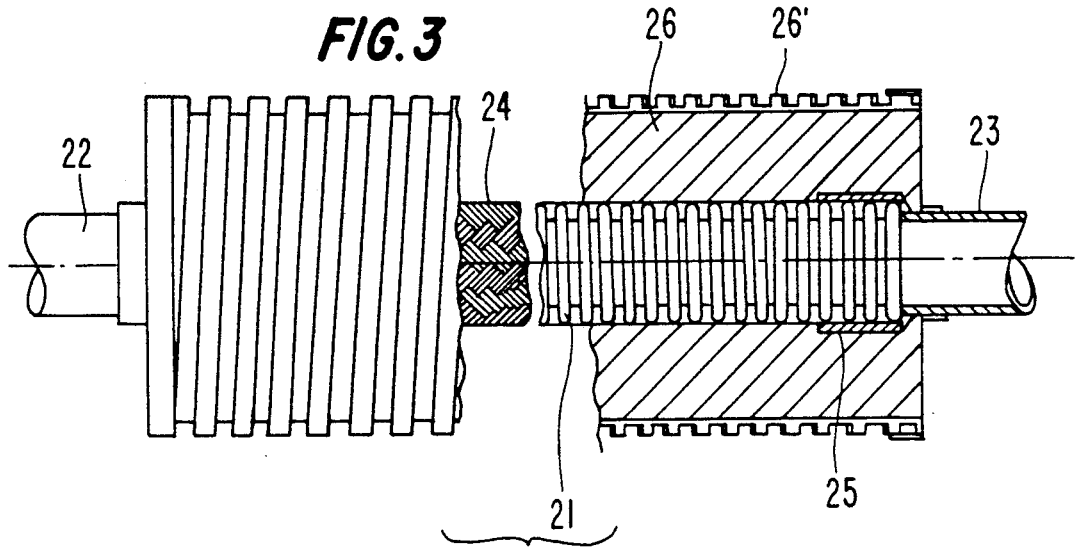
FIG. 3 is a part-sectional, part-side view of a corrugated flexible hose suitable in the system of the present invention.

Some types of hoses are particularly suitable for use in accordance with the present invention. FIG. 3 illustrates a corrugated metallic hose 21, located between terminals 22 and 23. Hose 21 is covered by a braiding 24 to support the hose with respect to axial forces. The braiding 24, for example a metal braiding, is secured by sleeves 25 on the coupling ends 22, 23, and surrounds, in part, the metal hose 21 Usually, the sleeves 25 are welded to the end portions 22, 23.

A heat insulation 26 surrounds the braiding 24, the heat insulation, itself, being surrounded at the outside by a protective jacket 26', as well known, in order to protect the hose system against external influence, and particularly against mechanical damage or mechanical loading.

Figure 4:
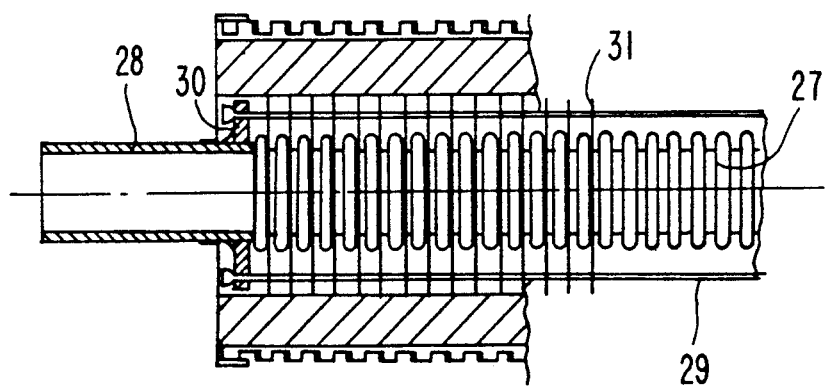
FIG. 4 is a fragmentary sectional view of a portion of the hose with a cable support.

FIG. 4 illustrates another construction which is equally suitable, in which a metallic corrugated hose 27 is coupled to end pieces 28—only one of which is shown. Axial support is obtained by cables or ropes 29, which are guided by disk elements 31, located in the grooves between the corrugations of the corrugated hose 27. This type of construction is described in detail in the referenced patent assigned to the assignee of the present application, U.S. Pat. No. 4,791,963, Gronert et al, the disclosure of which is hereby incorporated by reference.

Either one of the metallic corrugated hoses shown in FIG. 3 or 4 are equally suitable; hose portions as shown in FIGS. 3 and 4 may also be used to form the flexible joints 7 and 12 (FIGS. 1, 2).

A preferred type of flexible joint is illustrated in FIGS. 5 to 7. Flexible hose elements 32, 33 are tightly connected between connecting ends 34, 35 and a central coupling stub 36 (FIG. 5). Joints 37, 38, located diametrically opposite each other, are associated with the corrugated hose elements 32, 33. The joints 37, 38, in combination with external arms 39, 40 and internal double arms 41, 42, form the flexible joints permitting flexing of the parts 34, 35 about an axis A (FIG. 7). The arms 39, 40 are located between the connecting stubs 34 and 35, respectively, and the corrugated hose portions 32, 33. They are secured to radial braces 43, 44, for example by welding. Arm 42 of the pair 41, 42 is securely connected to the central pipe or nipple element 36. To permit distribution of the pivoting movement about the pivot pins 37, 38, the arm 41 is limited in deflection by stops 45, 46, see FIG. 6. To provide for heat insulation, an insulating jacket or sleeve 47 is placed over the entire flexible joint.

The flexible joint described is similar to known flexible joints used in industry for high-pressure, high-temperature applications.

Figure 8:
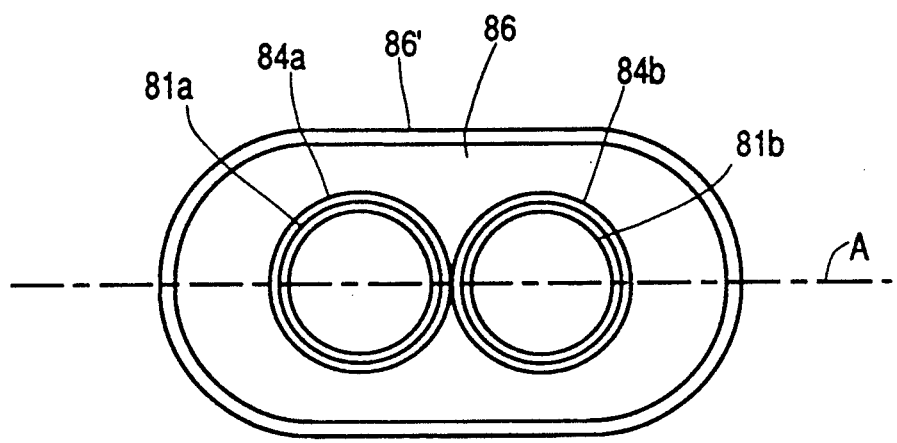
FIG. 8 is a schematic end view showing a dual hose unit.

The corrugated hose 4 may have circular cross section; in accordance with a preferred feature of the invention, however, the hose 4 has an oval cross section, in which the larger cross section axis is positioned transversely to the bending arc shown in FIG. 1 or 2, so that the hose 4 will have a smaller cross section in radial direction with respect to the bending arc than in a perpendicular direction. Such cross-sectional shape of the hose has the advantage that the hose has lesser resistance to bending than a circular hose of similar cross-sectional area. This permits making the hose even shorter than when a circular cross-sectional hose is used. FIG. 8 illustrates yet another variation in which, instead of using a single circular hose, two hose elements 81a, 82a, each surrounded by a jacket 84a, 84b are placed side by side, surrounded overall by an insulating jacket 86 which is protected by an outer protecting jacket 86'.

Figure 9:
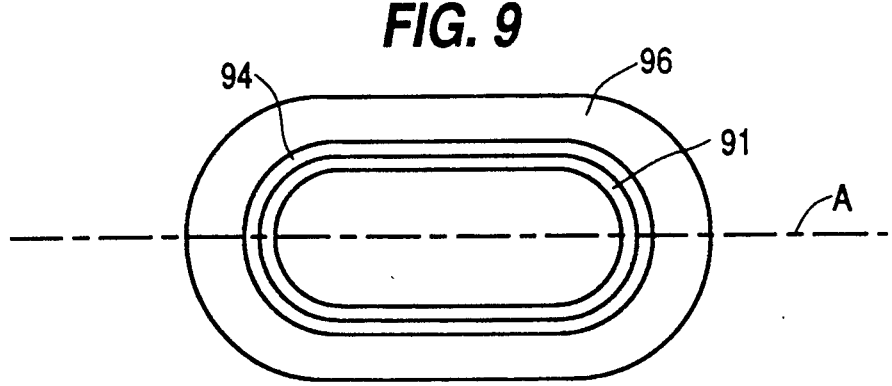
FIG. 9 is an end view similar to FIG. 8 and illustrating an oval hose.

Hose element 81b, with jacket 84b, is placed next to the hose 81a, 84a. Bending about the bending axis A, clearly, is easier than about an axis perpendicular thereto. FIG. 9 illustrates a single oval hose 91, having a braiding jacket 94, surrounded by an insulating jacket 96. The protective jacket about insulating jacket 96 has been omitted from FIG. 9 for ease of illustration. More than two parallel hoses, as illustrated in FIG. 8, may be used and, if desired, an intermediate protective jacket may be placed between the braiding 84a, 84b, or 94, respectively, and the insulating material to prevent internal abrasion thereof.

Various changes and modifications may be made, and features described in connection with any one of the embodiments may be used with any of the others, within the scope of the inventive concept.

What is claimed is:

1. Fluid connection system for a heat exchange fluid exposed to a movable solar heater,
    wherein said movable solar heater comprises
    a movable mirror system (1) including a mirror which is pivotable about a mirror pivot axis (3) positionable in a direction at least approximately at right angles to the position of the sun at any given time during the day;
    a heat exchange means (2) associated with the mirror system and positioned opposite said mirror pivot axis (3), with respect to said mirror, in a zone on which solar radiation reflected by said mirror is concentrated;
    fluid connection means (7, 8) located at a fixed position with respect to said movable mirror system,:
    a flexible hose (4) coupled to said heat exchange means (2) and bending upon movement of the mirror as the mirror follows the position of the sun; and
    coupling means (5, 6) coupling the fixed fluid connection means (7, 8) to said flexible hose (4),
    wherein, in accordance with the invention,
    said coupling means is at least approximately radially movable with respect to said mirror pivot axis (3) and positioned opposite said mirror pivot axis, with respect to a connection of said flexible hose (4) with said heat exchange means.

2. The system of claim 1, wherein said coupling means is movable at least approximately along a radial line connecting said mirror pivot axis (3) and said heat exchange means (2) at, at least approximately, noontime of the day.

3. The system of claim 1, wherein said coupling means (5, 6) comprises an essentially rigid pivot arm (6) and a coupling element (5) located at one end of the pivot arm and connected to an end of said flexible hose remote from the end of said flexible hose coupled to said heat exchange means (2), said pivot arm being pivotably connected at a fixed point to move said coupling element essentially radially with respect to said mirror pivot axis.

4. The system of claim 3, wherein said pivot arm (6) comprises an essentially rigid pipe forming a heat exchange fluid connection between said heat exchange fluid connection means (7, 8) and, through said coupling element (5), to said flexible hose (4).

5. The system of claim 4, including a flexible joint (7) connecting said essentially rigid pipe (6) to a fluid connection line (8) forming part of said heat exchange fluid connection means.

6. The system of claim 1, further comprising a flexible joint (12) coupling the flexible hose (4) to said coupling means (5, 6).

7. The system of claim 1, further including a flexible joint (12') coupling the flexible hose to said heat exchange means (2).

8. The system of claim 1, wherein said flexible hose (4) comprises a corrugated metal hose.

9. The system of claim 5, wherein said flexible joint comprises an angular deflection limited joint.

10. The system of claim 5, wherein said flexible joint deflection limited and comprises stop means (45, 46) limiting the deflection angle of said joint.

11. The system of claim 5, wherein said flexible joint comprises a corrugated hose portion;
    reinforcement means (24; 29, 31) axially reinforcing said corrugated metal hose portion;
    and heat insulating means (26, 47) surrounding said joint.

12. The system of claim 4, further comprising stop means (10) limiting the pivoting movement of said essentially rigid pipe (6).

13. The system of claim 12, further including force loading means (F, 11) applying a loading force to said essentially rigid pipe in a direction towards said stop means (10).

14. The system of claim 1, wherein said flexible hose (4) comprises a hose having an oval cross section, said hose being positioned in said system with the larger cross-sectional axis (A) extending transversely with respect to the flexing direction of said hose as the mirror system moves during the day.

15. The system of claim 1, wherein said flexible hose comprises a plurality of hose elements (81a, 81b) located adjacent each other, and along an axis (A) which is transverse to the flexing axis of said flexible hose as it moves with the mirror during the day.

* * * * *